United States Patent [19]

Richards

[11] Patent Number: 5,462,780

[45] Date of Patent: Oct. 31, 1995

[54] PIPE COATING COMPOSITIONS

[75] Inventor: Mildred C. Richards, Wakefield, Mass.

[73] Assignee: The Kendall Company, Mansfield, Mass.

[21] Appl. No.: 199,926

[22] Filed: Feb. 22, 1994

Related U.S. Application Data

[63] Continuation of Ser. No. 992,344, Dec. 17, 1992, abandoned.

[51] Int. Cl.[6] .................................................. B29D 22/00
[52] U.S. Cl. ...................... 428/35.8; 428/35.9; 428/36.8; 428/36.91; 138/146; 138/DIG. 6; 138/DIG. 7; 242/7.22; 524/504; 524/505
[58] Field of Search .................................. 524/504, 505; 242/7.22; 428/55.8, 35.9, 36.8, 36.91; 138/146, DIG. 6, DIG. 7

[56] References Cited

U.S. PATENT DOCUMENTS 4,994,508  2/1991  Shiaki et al. ........................ 524/505

OTHER PUBLICATIONS

Encyclopedia of Polymer Science and Engineering vol. 11 Peroxy–Polyesters.

*Primary Examiner*—Peter D. Mulcahy
*Attorney, Agent, or Firm*—Alvin Isaacs; David J. Koris

[57] ABSTRACT

Improved thermoplastic adhesive liquid coatings adapted for use as a primer coating for inground pipelines, which coatings include an amphipathic metal complexing reagent in an amount effective to provide protection against cathodic disbondment, the improvement being the bonding to the thermoplastic moiety of an anhydride in an amount sufficient to provide still further protection against degradative environmental forces; and novel protective pipewrap systems including same.

5 Claims, No Drawings

PIPE COATING COMPOSITIONS

This is a continuation of application Ser. No. 07/992,344, filed Dec. 17, 1992, abandoned.

The present invention relates in general to coatings for protecting metal articles and more particularly to cathodic protection against environmental forces by thermoplastic rubber coatings for pipelines intended for inground implantation.

Various protective pipeline coatings are well known in the art. In addition, federal regulations require that all major pipelines be cathodically protected in order to markedly decrease failures due to corrosion. Cathodic protection is defined as reduction or elimination of corrosion by making the metal a cathode by means of an impressed direct current or attachment to a sacrificial anode, usually magnesium, aluminum, or zinc.

While turning the entire structure into a cathode will eliminate corrosion in general, breaks and imperfections in the pipeline coating, do present special problems. Initially, such breaks or "holidays" are protected by the negative charge, yet with time and in part due to moisture and minerals in the soil, it is precisely this negative charge which accelerates undercutting and disbondment of the coating system in the areas of holidays.

For these reasons, the pipeline coating art has heretofore devoted considerable attention to the task for providing cathodic disbondment resistance to the various protective coating systems employed.

Particularly efficacious systems for protecting metal pipes and the like are those comprising a rubber-based primer coating and an adhesive tape outerwrap. While these rubber-based pipewraps provide exceptionally fine protection against corrosion and other degradative environmental forces, there always remains a need for further increasing the protection against degradative environmental forces.

As heretofore mentioned, the present invention is directed to an improvement over the application Serial No. 329,715 filed Mar. 28, 1989, now U.S. Pat. No. 5,108,809, in the names of Patil et al and assigned to the present assignee.

U.S. Pat. No. 5,108,809 solved the aforementioned task by providing a synthetic elastomer and/or natural rubber-base liquid coating comprising an organic solution of synthetic elastomer and/or natural rubber, a tackifier and an amphipathic metal complexing cathodic disbondment inhibitor. As used herein the term "cathodic disbondment inhibitor" meant a reagent which prevented corrosion of metal articles.

More specifically, the cathodic disbondment inhibitor was a weak acid and a reducing agent. Most preferably, however, the cathodic disbondment inhibitor consisted essentially of the resin formed by self-condensation of sterically hindered phenol of the formula:

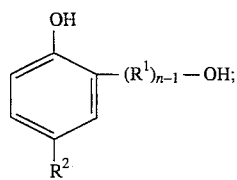

or

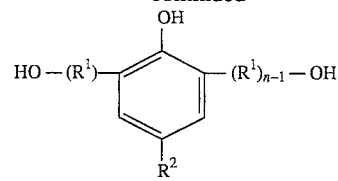

wherein $R^1$ is an alkyl group having 1–4 carbon atoms; $R^2$ is alkyl or arylalkyl wherein the alkyl moiety contains at least 8 carbon atoms; and n is 1 or 2.

While the invention described and claimed in the aforementioned U.S. Pat. No. 5,108,809 does in fact provide significant protection against cathodic disbondment, the protection against the environment so provided is nevertheless less than that which would be optimally desired.

Accordingly, the task of the present invention, stated simply, is to provide improved or still greater protection against degradative environmental forces than that which is obtainable according to the invention described and claimed in the aforementioned copending application.

BRIEF DESCRIPTION OF THE INVENTION

In accordance with the present invention, the aforementioned task is further solved by providing a thermoplastic adhesive liquid coating composition of the type described and claimed in the aforementioned U.S. Pat. No. 5,108,809, the coating composition further containing an anhydride bonded to the backbone oft he thermoplastic polymer moiety.

DETAILED DESCRIPTION OF THE INVENTION

The present invention is in general directed to the task of producing an environmentally resistant coating, and is specifically directed to increasing the longevity of pipe in a rubber-based pipewrap system for protecting metal pipes in the ground. Such systems include a rubber-based primer coating which is first applied to the surface of the metal pipe by spraying, brushing, dipping or rugging followed by application of a rubber-based adhesive tape which is then wound over the previously applied primer coating.

While not limited thereto, for purposes of illustration a typical rubber-based primer coating will comprise a solution or dispersion of rubber and at least one tackifier in a volatile solvent.

The present invention further protects against environmental forces by providing for a thermoplastic adhesive liquid coating composition comprising an anhydride functionality. Any of the well known thermoplastic rubber polymers capable of being functionalized by anhydride may be used. By way of illustration and not limitation mention may be made of copolymers of, polyethylene, polybutylene, etc. The preferred thermoplastic rubber is a triblock copolymer consisting of polystyrene end blocks and polyethylene or polybutylene midblocks functionalized with anhydrides, e.g. those of the Kraton series commercially available from Shell Chemical.

The anhydride may be any polymerizable anhydride, maleic anhydride being particularly preferred. As examples of other useful polymerizable anhydrides, mention may be made in general of the anhydrides derived from unsaturated mono- and dicarboxylic acids, e.g. propionic, butenoic, acrylic, itaconic, etc.

In sum, and in its broadest aspect, the present invention is directed to increasing the longevity of metal coatings in general, and specifically to thermoplastic rubber pipeline coatings. Thus the invention is to be employed as an additive to the currently used rubber-based coating systems described in U.S. Pat. No. 5,300,356 are incorporated by reference herein.

The amount of anhydride to be bonded to the polymeric backbone so as to further increase the protection against environmental forces will be at least in part dependent upon the anhydride employed. Accordingly, it is not capable of precise quantification. For this reason, the amount employed will be defined as being an "effective amount" i.e. an amount sufficient to provide increased protection over that obtainable absent the anhydride. However, by way of illustration, it may be said that amounts on the order of from about 1 to about 10 are generally useful.

In accordance with the present invention, the rubber-based primer coating will also include disbondment inhibitor comprising an amphipathic metal complexing reagent in an amount ranging from 5–50 phr. More specifically, the cathodic disbondment inhibitor is a weak acid and a reducing agent. Most preferably, however, the cathodic disbondment inhibitor consists essentially of the resin formed by self-condensation of a sterically hindered phenol of the aforementioned formulae.

The preferred uncondensed phenolic resin is a heat reactive resin of the following formula:

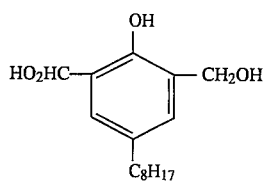

A typical rubber-based adhesive tape will comprise a suitable backing material, eg. a polyolefin such as polyethylene carrying a layer of an adhesive rubber coating, e.g., a blend or homogenous mixture of virgin butyl rubber and/or halogenated butyl rubber alone or in combination with butyl rubber; or a thermoplastic rubber and at least one tackifying resin. As is well known in the art, the adhesive coating may also contain various additives providing specific desired functions such as antioxidants, bactericides, fillers, pigments, plasticizers, softeners, curing agents, sequestering agents, etc. The preferred rubber being a thermoplastic rubber compatible with the thermoplastic rubber in the novel primer coating.

Irrespective of the particular rubber or blend of rubbers employed, the formulation for the primer coating as well as for the tape will also include at least one tackifying resin specific to the rubber used for increased adhesion. As examples of such tackifiers heretofore known and marketed to the adhesive industry for such purposes, mention may be made of the following: rosins such as gum, wood or tall oil rosin; modified rosins, e.g. polymerized rosin or hydrogenated rosin; rosin esters such as pentaerythritol-wood rosin, glycerine-hydrogenated rosin, glycerine-highly stabilized rosin; and a pentaerythritol-highly stabilized rosin; polymerized petroleum hydrocarbons, e.g. cycloaliphatic hydrogenated olefins, olefins, aliphatic petroleum hydrocarbons, modified aromatic hydrocarbons, dicyclopentadiene, mixed olefins, alkyl-aromatic petroleum hydrocarbons, modified aromatic hydrocarbons; polymerized terpenes such as alpha-pinene, d-limonene, beta-pinene, terpene, etc.; miscellaneous resins such as alpha-methyl styrene-vinyl toluene, alpha-methyl styrene, styrene, terpene phenolic, coumarone-indenes, etc.

As previously noted, the adhesive formulations may typically include other materials performing specific desired functions. As illustrations of such additives, mention may be made of fillers such as carbon black, zinc oxide, clays, chalk, whitings, calcium silicate, barium sulfate and the like in order to reduce the cost, increase the specific gravity, and/or to raise the viscosity; plasticizers and softeners such as mineral oil, lanolin, etc.; antioxidants, e.g. aromatic amine antioxidants, substituted phenols, hydroquinone (p-dihydroxybenzene), etc; curing agents such as sulfur, organic peroxides and the like; accelerators; sequestering agents; biocides such as bactericides, etc.

By way of recapitulation, the present invention is applicable to the per se known rubber-based pipe wrap system comprising a primer coating applied to the metal pipe surface and an overlying adhesive tape wrapped over the primer coating, e.g. spirally wound over the primer, to provide a protective coating for the pipe. The essence of the invention therefore, is the concept of including in the primer coating composition, an additional protective agent by providing for a thermoplastic rubber comprising an anhydride functionality.

The primer coating of this invention may be prepared in known manner by forming a solution or homogenous dispersion of the individual components in a suitable volatile organic solvent or mixture of solvents, e.g. toluene, methyl isobutyl ketone, isopropyl alcohol, etc.

The following examples show by way of illustration and not by way of limitation the practice of the present invention to increase pipeline longevity. The following primer coatings were prepared similar to that described in Col. 6 of the aforementioned U.S. Pat. No. 4,472,231;

EXAMPLE I

| | |
|---|---|
| Thermoplastic rubber functionalized with maleic anhydride | 100 parts |
| Rosin ester | 100 parts |
| Self-condensation product of di-orthomethylol, para octyl phenol | 10 parts |
| Toluene | 840 parts |

The aforementioned ingredients were admixed and brushed onto a pipe for adhesion and failure mode testing. Example I was tested in accordance with a procedure referred to as spiral unwind. In this procedure, a 2-inch diameter and 6 inch long spirally tape wrapped pipe is mounted horizontally in a jig to allow the pipe to turn freely when peeling the tape. The angle of peel is maintained at a constant 90° and at a speed of 4 inches per minute. The tape coating is spirally cut with a set of knives located one inch apart, so as to create strips of tape coating adapted for attachment to the grips of an Instron Universal Testing Machine. During testing, the individual strips are pulled upwards by the Instron Machine while the pipe rotates. The force necessitated for pulling the coating from the pipe is recorded by taking the average of 3 readings measured in ounces per linear inch.

Example I was brushed onto a steel pipe and coated with an adhesive tape coating system as described in copending Ser. No. 403,415, hereby incorporated by reference, using a crosslinked adhesive (IA) and an uncrosslinked adhesive (IB). The thus coated pipe was thereafter heated for 10 minutes at 250° F.

EXAMPLE II (Control)

Example II was prepared by admixing the following ingredients:

| Butyl rubber | 100 parts |
|---|---|
| Self condensation product of di-ortho methylol, para-octyl phenol | 18 parts |
| Hydrocarbon resin | 100 parts |
| Methanol | 5 parts |
| Toluene | 5 parts |
| Heptane | 90 parts |

The aforementioned solution was brushed onto a steel pipe and coated with an adhesive coating identical to Example I. Accordingly, IIA comprises a crosslinked adhesive and IIB an uncrosslinked adhesive. The thus coated pipe was heated for 10 minutes at 250° F.

Examples I and II were thereafter subjected to the spiral unwind procedure previously described to obtain adhesion and mode failure test data. Table 1 depicts the results.

Table-I

| | IA | IB | IIA | XIB |
|---|---|---|---|---|
| Spiral Unwind oz/in | 587 | 4.73 | 277 | 454 |
| Failure I | 100 cohesive failure | 100 cohesive failure | 100 primer failure | 70% primer failure 30% cohesive failure |

Table 1 demonstrates increased chemical adhesion/bonding between the pipe surface and tape coating system of the present invention which advantageously results in increased pipe longevity. Table 1 illustrates cohesive failure in the present invention as opposed to primer failure thereby indirectly proving greater adhesion of the primer to the pipe surface. In other words, the bond between the pipe surface and the primer is stronger in the present invention than the bonds within the adhesive layer.

Cohesive failure is defined as tearing within the adhesive layer whereas primer failure is tearing of the primer from the pipe surface. Thus primer failure results in an exposed i.e. unprotected pipe surface. Accordingly cohesive failure is much preferred and always desired to protect the pipe from degradative environmental forces thereby increasing pipe longevity.

Since certain changes may be made without departing from the scope of the invention herein described, it is intended that all matter contained in the foregoing description, including the examples, shall be taken as illustrative and not in a limiting sense.

What is claimed is:

1. An article of manufacture protected against degradative environmental forces comprising:

a metal pipe for inground implantation;

a primer coating carried on the outer surface of the pipe; and an adhesive tape comprising a backing material carrying an adhesive layer on its inner surface covering the primer coating, wherein the primer coating is an adhesive composition comprising a mixture of solid components including at least one synthetic elastomer and an effective amount for an increase in protection against environmental forces of a cathodic disbondment inhibitor consisting essentially of the resin formed by self-condensation of a sterically hindered phenol of the formulae:

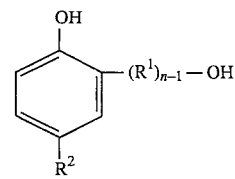

or;

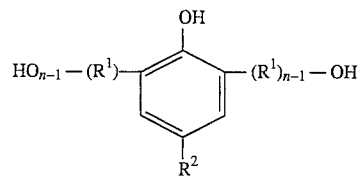

wherein $R^1$ is a alkylene having 1–4 carbon atoms;

$R^2$ is alkyl containing at least 8 carbon atoms or arylalkyl; and n is i or 2, characterized in that the elastomer consists essentially of a triblock copolymer backbone having polystyrene end blocks and polyethylene or polybutylene mid blocks, the tri-block copolymer being functionalized with an effective amount of anhydrides bonded to the polymer backbone.

2. An article of manufacture as defined in claim 1 wherein the adhesive layer of the adhesive tape consists of a thermoplastic rubber-based adhesive composition.

3. An article of manufacture as defined in claim 1 wherein the primer coating further includes a tackifier.

4. An article of manufacture as defined in claimed 3 wherein the tackifier is pentalyn.

5. An article of manufacture as defined in claim 1 wherein the anhydride is maleic anhydride.

* * * * *